United States Patent [19]

Lindenberger

[11] Patent Number: 4,735,761
[45] Date of Patent: Apr. 5, 1988

[54] PROCESS AND APPARATUS FOR PRODUCING A SHAPED BODY OF PLASTICS MATERIAL

[75] Inventor: Werner Lindenberger, Aesch, Switzerland

[73] Assignee: H. Obrist & Co. AG, Reinach, Switzerland

[21] Appl. No.: 772,738

[22] Filed: Sep. 5, 1985

[30] Foreign Application Priority Data

Sep. 18, 1984 [CH] Switzerland .................. 4464/84

[51] Int. Cl.⁴ .................. B29C 31/06; B29C 33/34; B29C 43/08; B29C 43/18
[52] U.S. Cl. .................. 264/511; 198/406; 198/408; 198/471.1; 198/478.1; 264/267; 264/297.6; 264/325; 264/334; 264/571; 264/DIG. 41; 425/125; 425/126 T; 425/261; 425/297; 425/340; 425/345; 425/415; 425/416; 425/423; 425/DIG. 5; 425/DIG. 201; 425/DIG. 218
[58] Field of Search ............ 264/267, 571, 511, 335, 264/345, 297.6, DIG. 65, 334, 294, 323, 325, 500, DIG. 41; 425/125, 126 R, 261, 345, 415, 423, 809, DIG. 5, DIG. 131, DIG. 201, DIG. 218, 288, 297, 340, 416, 540; 198/406, 408, 471.1, 478.1

[56] References Cited

U.S. PATENT DOCUMENTS

| | | | |
|---|---|---|---|
| 2,812,548 | 11/1957 | Quinche et al. ............... | 425/125 |
| 2,947,035 | 8/1960 | Baker ............................ | 264/267 |
| 3,047,910 | 8/1962 | Downs .......................... | 264/267 X |
| 3,172,933 | 3/1965 | Flax ............................... | 264/325 X |
| 3,244,788 | 4/1966 | Michel et al. ................. | 264/267 |
| 3,256,378 | 6/1966 | Hauf .............................. | 264/267 |
| 3,313,875 | 4/1967 | Magerle ........................ | 264/267 |
| 3,330,006 | 7/1967 | Jenkins ......................... | 425/125 |
| 3,563,377 | 2/1971 | Southcott ..................... | 198/408 X |
| 3,591,896 | 7/1971 | Tartaglia ...................... | 425/DIG. 218 |
| 3,619,858 | 11/1971 | Sutch ............................ | 425/125 |
| 3,677,673 | 7/1972 | Shapiro ........................ | 425/261 X |
| 4,352,775 | 10/1982 | Magerle ........................ | 264/DIG. 41 |

FOREIGN PATENT DOCUMENTS 1241073 11/1959 France .
2053077 2/1981 United Kingdom .

Primary Examiner—Jeffery Thurlow
Assistant Examiner—Leo B. Tentoni
Attorney, Agent, or Firm—William R. Hinds

[57] ABSTRACT

The tubular body is laid in a horizontal position on a tapered suction drum and pivoted thereby into a vertical axis which is in coaxial relationship with the axis of a mandrel with a punch. The tubular body is then pushed from the surface of the suction drum on to the mandrel by a thrust member. The mandrel and/or the die is mounted displaceably in a vertical direction, which permits particularly stable and precise guidance. A plurality of dies with mandrels and punches associated therewith is disposed on a rotary member. In the course of a revolution of the rotary member, the tubular body on the mandrel is connected to a squeeze moulding in the die.

11 Claims, 5 Drawing Sheets

PROCESS AND APPARATUS FOR PRODUCING A SHAPED BODY OF PLASTICS MATERIAL

FIELD OF THE INVENTION

This invention relates to a process for producing a shaped body of plastics material and for simultaneously connecting the shaped body to a tubular body wherein a plurality of dies are disposed on a drivable rotary member at the peripheral region thereof and a mandrel having a punch is associated with each die on the rotary member, and wherein a tubular body is pushed onto a mandrel and then the punch with the mandrel is pressed into the die which is associated therewith and which has been previously filled with plasticised plastics material. The invention also relates to an apparatus for carrying out this process.

SUMMARY OF THE INVENTION

Processes and apparatuses of that kind are used in particular for the production of plastics tubes. In that situation, the shoulder portion of the tubes is produced by squeeze moulding and is generally connected to the tubular part of the tube in the same working operation.

SUMMARY OF PRIOR ART

A process of that kind and the apparatus for carrying out the process are disclosed, for example, in German published application DE-A-30 23 415. In that arrangement, the plasticised plastics material is introduced into the open die from above, in the form of an annular blank. The filling station is fixedly disposed above the rotary member with the dies moving cyclically therepast. At the filling station, the punch with the mandrel is pivoted out to clear the die so that the punch and the mandrel are disposed approximately at an angle of 90° with respect to the centre line of the die or approximately parallel to the plane of the rotary member. In that position the tubular hollow bodies are also pushed on to the mandrel; for reasons relating to the production process, such hollow bodies must be fed to the rotary member in a horizontal position. For the purposes of closing the squeeze mould, the punch and the mandrel are pivoted back again by means of a control device so that they are in coaxial relationship with the die. The punch and the mandrel are then pressed downwardly towards the die.

One disadvantage of that apparatus is that the pivotal movement of the punches out of the actual line of pressing requires a large number of mechanically movable components. In addition, guidance and mounting problems occur as it is difficult to achieve an absolutely coaxial relationship between the dies and the punches which can be pivoted out of the way. Finally, the punches and the mandrel are only guided and mounted at one end on a gallows-like arrangement so that the punch can tilt in the die when high closing pressures occur. Another disadvantage of the known process is that the closing pressure is applied by an elbow lever at an operating station. In that case, the die and the punch remain mechanically interlocked during the pressing and cooling phase without, for example, the possibility of being able to adjust the pressing pressure. This may possibly result in an inadequate closing pressure and thus inadequate pressing of the shaped body.

French patent FR-A-1 241 073 discloses a process and apparatus for the production of tubes, wherein a preformed tube shoulder portion is welded to the tubular body of the tube. That procedure is carried out in various operating steps on a rotary member. In that case, the operation of loading the mandrels is also effected in a vertical position. However, for loading purposes, the mandrels must be introduced into the tubular bodies and the pressing pressure is from below in an upward direction as the preformed tube shoulder portions lie on the mandrel at the upper end thereof. Therefore, that arrangement is not suitable for a squeeze moulding process in which the pressing pressure must be from above in a downward direction into the mould which is filled with plasticised plastics material.

BRIEF DESCRIPTION OF PREFERRED FEATURES

Therefore, an object of the present invention is to provide a process and an apparatus of the kind set forth in the opening part of this specification, with which it is possible to fill the dies in a very simple manner without the punches having to be pivoted out of their vertical line of movement. The invention also seeks to provide that the apparatus shall permit an extremely precise guiding action for the punches and shall have a low level of susceptibility to trouble. The invention in particular also seeks to simplify the loading and unloading operation, as those operations have a substantial influence on the cycle time.

In general, the objects are attained by a process and apparatus having, inter alia, some or all of the following features: movement of the tubular bodies into a vertical position beneath a tubular mandrel and above an associated die; mandrel and die being arranged coaxially and mounted on a rotary member carrying a series of such mandrels and dies; displacement vertically of at least one of the items consisting of the mandrel and die for the purpose of loading the tubular bodies on the mandrels, the extent of displacement corresponding at least to the length of the tubular body; pushing of the tubular body upwardly onto the mandrel; rotation of the rotary member with the still displaced items to a filling station and filling of the die with plasticised material; rotation of the rotary member further, thereby moving together vertically the mandrel and the die by a stationary control cam; keeping the mandrels and dies aligned in the same position and under pressure with the control cam and with a pressure actuated piston; and displacement vertically again of the mandrel and die with the control cam, and unloading of the tubular bodies with the shaped body.

The fact that the mandrels are loaded in a vertical position makes it unnecessary to pivot the mandrels. By virtue of this arrangement, the punches and the mandrels only have to be mounted displaceably in the line of pressing movement, which permits a mounting and guiding action which is substantially more precise and stable. Two advantages are achieved by virtue of the tubular bodies being pushed on to the mandrels in the loading position. On the one hand, it means that the mandrel does not have to be moved at the loading station in order to receive the tubular body, which is a substantial simplification in the apparatus. On the other hand, when the mandrel has been fully pushed on in the loading position, the region above the die is again free so that the die can be filled with plastics material.

A particular intensive connection between the tubular body and the shaped body is produced if at least the region, which is to be joined to the shaped body, of the tubular body which is pushed on to the mandrel and/or the shaped body blank is preheated in the die before being pressed into the die. This mode of operation provides for intensive fusing of the shaped body or the shoulder of the tube, to the tubular body. It prevents the formation of a boundary layer which, in an extreme situation, could cause the shaped body to come away from the tubular body. As the axis of the die does not have to be pivoted, it is a relatively easy matter to arrange a heating device.

A particularly simple feed of the tubular bodies which are supplied to the rotary member in a horizontal position is achieved if they are brought into position beneath the mandrel by means of a rotatable tapered suction drum and are pushed from the surface of the suction drum on to the mandrel by a thrust member. The rotary movement of the tubular bodies therefore does not take place on the rotary member itself but outside it with a device which is stationary relative to the rotary member. The suction drum permits the tubular bodies to be gripped and delivered in a simple fashion, while being treated carefully. The thrust member can also be stationary so that control thereof is a relatively easy matter.

Unloading is effected in a similarly easy fashion if the tubular bodies which are connected to the shaped body, after the pressing operation, are transferred from the mandrel on to the surface of a rotatable tapered suction drum. The suction drum in turn pivots the bodies into a horizontal position, which is advantageous and desirable for the purpose of automatically conveying them away on a conveyor belt.

With the mandrel and/or the die displaced for the purposes of loading and unloading in such a way that an intermediate space is formed, which corresponds at least to the overall length of the tubular body, the suction drum can be arranged directly in the region of rotation of the rotary member, between the die and the mandrel. By virtue of that arrangement, there is also no need for the dies to be retracted into a radially inward position for loading and unloading purposes. On the contrary, the dies may be fixedly disposed on the rotary member, in regard to their radial position.

Simplification with regard to closing the tool and carrying out the pressing operation is achieved by producing mechanically the stroke movement of the mandrels and/or dies by way of a control cam in the course of a revolution of the rotary member, and effecting the operation of pressing the shaped body by means of a pressure fluid cylinder. This makes it possible to use a relatively simple hydraulic cylinder, as the low forces for lowering and raising the mandrel or the punch are transmitted by way of the control cam. Therefore, the hydraulic piston has to be designed to provide only a relatively short stroke. The control cam also has the advantage that, in the event of a defect in the hydraulic system, the mandrel is lifted in any case so as to avoid a collision with the devices which are fixedly arranged above the dies, such as for example suction drums or extruders for filling the dies.

The die is filled in a particularly advantageous manner if, for the purpose of receiving the plastics blank at the filling station, it is moved towards the discharge opening for the plastics material. In that way, the plastics blank can be taken off directly at the discharge opening and does not have to be thrown into the die under free fall conditions. Free fall ejection of the blank involves the risk that the plastics blank which generally issues in an annular form, may drop into the die in an inclined position if, for example, the blank is not cleanly severed from the discharge opening. In addition, the filling operation may also be optimised by virtue of the plastics blank, which is disposed in the die and which has been separated from the flow of material, having been separated from the closed discharge opening by the effect of heat. Such heating causes the plastics blank to be melted away from the discharge opening. It is not possible for any viscous threads of material to be formed, which still join the blank to the discharge opening. In addition, the heating effect ensures that the plastics blank does not cool down to an excessive degree at the surface so that a relatively rigid surface layer can be already formed prior to deformation thereof.

The advantages of the apparatus according to the invention are, in particular, that mounting, guidance and control of the mandrels or punches can be optimised. The moveable components can be reduced to the necessary minimum and, overall, only low masses have to be accelerated or decelerated.

With a pressing device arranged on the rotary member above each die, the stroke movement or the closing pressure can be varied independently of the relative position of the rotary member during the rotary movement. In addition, this arrangement permits the closing pressure to be held at a constant level during a given period of time.

Particularly simple control of the stroke movement can be achieved if a stationary cylindrical drum is arranged on the axis of rotation of the rotary member in coaxial relationship and if the punches or mandrels and/or the dies, for carrying out a stroke movement, are engaged with a control cam on the periphery of the drum. It will be seen that this provides a positive guiding action so that the mandrels and the dies are always moved apart from each other in a given region of the rotary member. This is advantageous, in particular, for safety reasons in order to prevent the mandrels or dies colliding with devices which are fixedly disposed in the region of rotary movement of the rotary member. The fact that the mandrel and the die are simultaneously moved apart also gives the advantage that the control cam on the stationary cylindrical drum does not have to be too steep, whereby undesirable transverse forces on the control can be reduced.

The plastics blank which issues from the discharge opening can be transferred into the dies in a particularly simple manner if they can be moved downwardly at the control cam to load the mandrels against the force of a spring and if the control cam, in the region of the loading station, is of a steep configuration such that the dies are moved towards the discharge opening for the plastics material by the spring force with an approximately perpendicular stroke movement. By means of that steep stroke movement, the plastics blank can be deposited in the cavity in the die. In this arrangement, the angle of rise can be so selected that, when the uppermost point of the die is reached, at the filling station, the underside of the plastics blank is in direct contact with the cavity in the die.

Accordingly, the present invention provides a process for producing a shaped body of plastics material and for simultaneously connecting the shaped body to a tubular body, the process comprising the steps of:

moving each of a series of tubular bodies into a vertically oriented position vertically beneath a respective coaxially oriented tubular mandrel and vertically above an associated respective die, each said tubular mandrel and die being coaxial with each other and with said tubular body therebetween and mounted on a rotary member carrying peripherally a series of such tubular mandrels and dies each for receiving such a tubular body therebetween, at least one of said mandrel and associated die being displaced vertically away from the other to provide a clearance therebetween sufficient to receive the length of the tubular body;

pushing said vertically positioned tubular body upwards onto the coaxially oriented tubular mandrel;

rotating said rotary member with said relatively displaced mandrel and die to a filling station and filling said die with plasticised plastics material;

rotating said rotary member further and thereby moving together vertically said mandrel, tubular body and die by the action of a stationary control cam cooperating with at least one of said mandrel and said die, thus pressing said tubular body on the mandrel into the coaxially located filled die;

keeping the mandrel and die aligned in the same position with said control cam and pressurizing a pressure actuated piston to force a punch through said tubular mandrel into said plastics material to shape said plastics material in said die and to connect the shaped body so formed to said tubular body; and displacing again said mandrel and die vertically relatively away from each other via said control cam and unloading the tubular body with the shaped body.

Further, the invention provides an apparatus for producing a series of shaped bodies of plastics material and simultaneously connecting each shaped body with an associated one of a series of tubular bodies, the apparatus comprising:

a drivable rotary member rotatable about a vertical axis;

a stationary cylindrical drum mounted in coaxial relationship with the axis of rotation of said rotary member, said cylindrical drum being formed with a control cam;

a plurality of dies mounted peripherally on said rotary member;

a plurality of tubular mandrels respectively mounted fixedly coaxially with said dies on vertical axes parallel to the axis of rotation of said rotary member;

a plurality of punches allocated respectively to said tubular mandrels for reciprocation therewith;

means cooperating with said control cam for separating vertically each said mandrel and associated punch from the associated die to provide a space for the introduction of a vertically oriented tubular body beneath and coaxial with said tubular mandrel and above and coaxial with said die, and for subsequently bringing them together to insert the end of a tubular body into the associated die;

means for introducing a vertically oriented tubular body into each said space beneath and coaxial with one of said mandrels and above and coaxial with said die;

means for pressing a vertically oriented tubular body upwardly onto a said mandrel when introduced into a said space between that mandrel and the associated die;

means for filling each die with a plasticised plastics material at a stationary location traversed by said dies before said mandrel, tubular body and die are brought together by said means cooperating with said control cam; and a plurality of pressing means allocated respectively to said tubular mandrels and their associated punches for displacing one of the items consisting of one of said tubular mandrels with its associated punch and the cooperating die to press said mandrel and punch into said die for pressing a shaped body and connecting a tubular body thereto, said pressing means comprising pressure fluid actuated piston and cylinder assemblies individually actuatable independently of the position of said rotary member about its axis of rotation.

The invention further provides apparatus for producing a series of shaped bodies of plastics material and simultaneously connecting each shaped body with an associated one of a series of tubular bodies, the apparatus comprising:

a drivable rotary member;

a plurality of dies mounted peripherally on said rotary member a plurality of tubular mandrels respectively mounted coaxially with said dies on vertical axes parallel to the axis of rotation of said rotary member;

a plurality of punches allocated respectively to said tubular mandrels for reciprocation therewith;

means for separating each said mandrel and associated punch for the associated die to provide a space for the introduction of a vertically oriented tubular body beneath and coaxial with said tubular mandrel;

means for introducing a vertically oriented tubular body into each said space beneath and coaxial with one of said mandrels;

means for pressing a vertically oriented tubular body upwardly onto a said mandrel when introduced into a said space beneath that mandrel;

means for filling each die with a plasticised plastics material at a stationary location traversed by said dies;

a plurality of pressing means allocated respectively to said tubular mandrels and their associated punches for displacing one of the items consisting of one of said tubular mandrels with its associated punch and the cooperating die to press said mandrel and punch into said die for pressing a shaped body and connecting a tubular body thereto; and a rotatable tapered suction drum mounted for rotation about a fixed axis and formed with tubular body positioning means and suction means for retaining a tubular body with its axis in a plane containing said axis of rotation of said tapered suction drum, means for rotating said suction drum about said last mentioned axis, said drum being positioned for the axis of said tubular body to be coincidental with the axis of each mandrel when presented to said mandrel, to enable the transfer of a tubular body between said drum and said mandrel.

BRIEF DESCRIPTION OF THE DRAWINGS

An embodiment of the invention is illustrated in the drawings and described in greater detail hereinafter. In the drawings.

DETAILED DESCRIPTION OF PREFERRED EMBODIMENT

Figure 1:
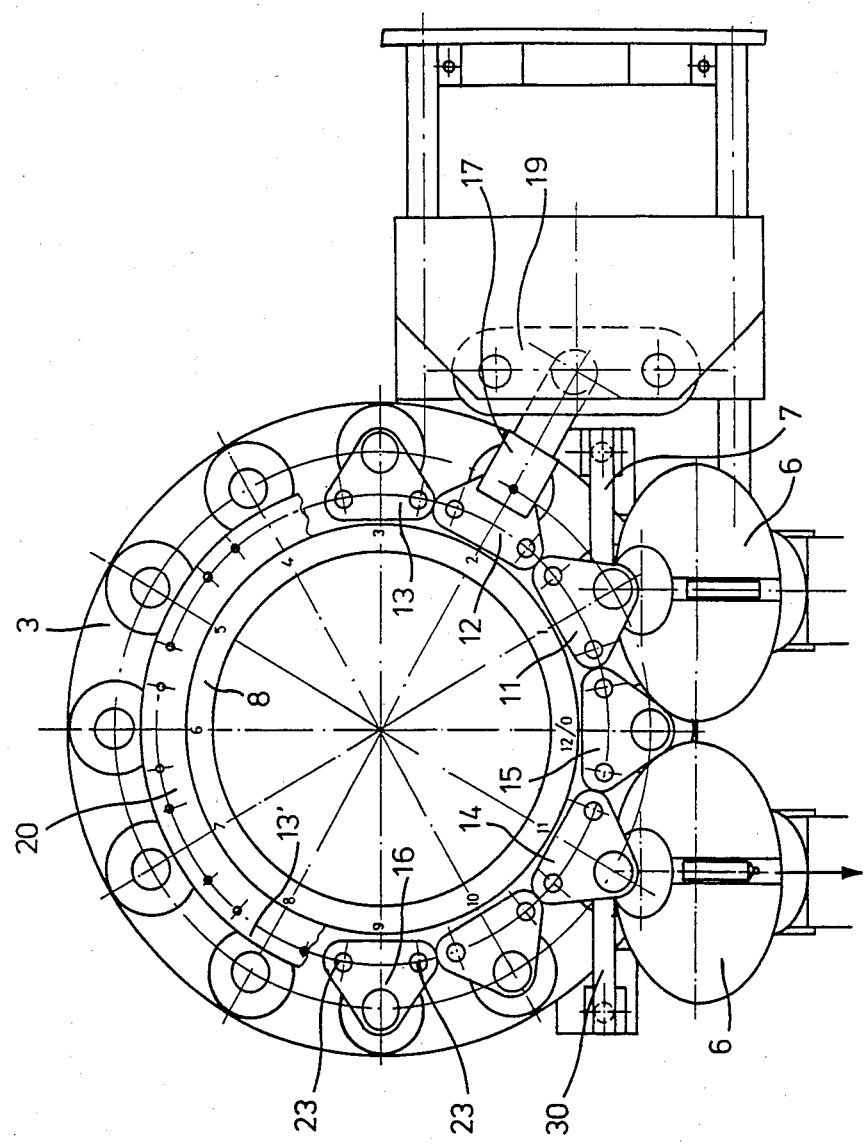
FIG. 1 shows a plan view of an apparatus according to the invention with various stations on the rotary member.
Figure 2:
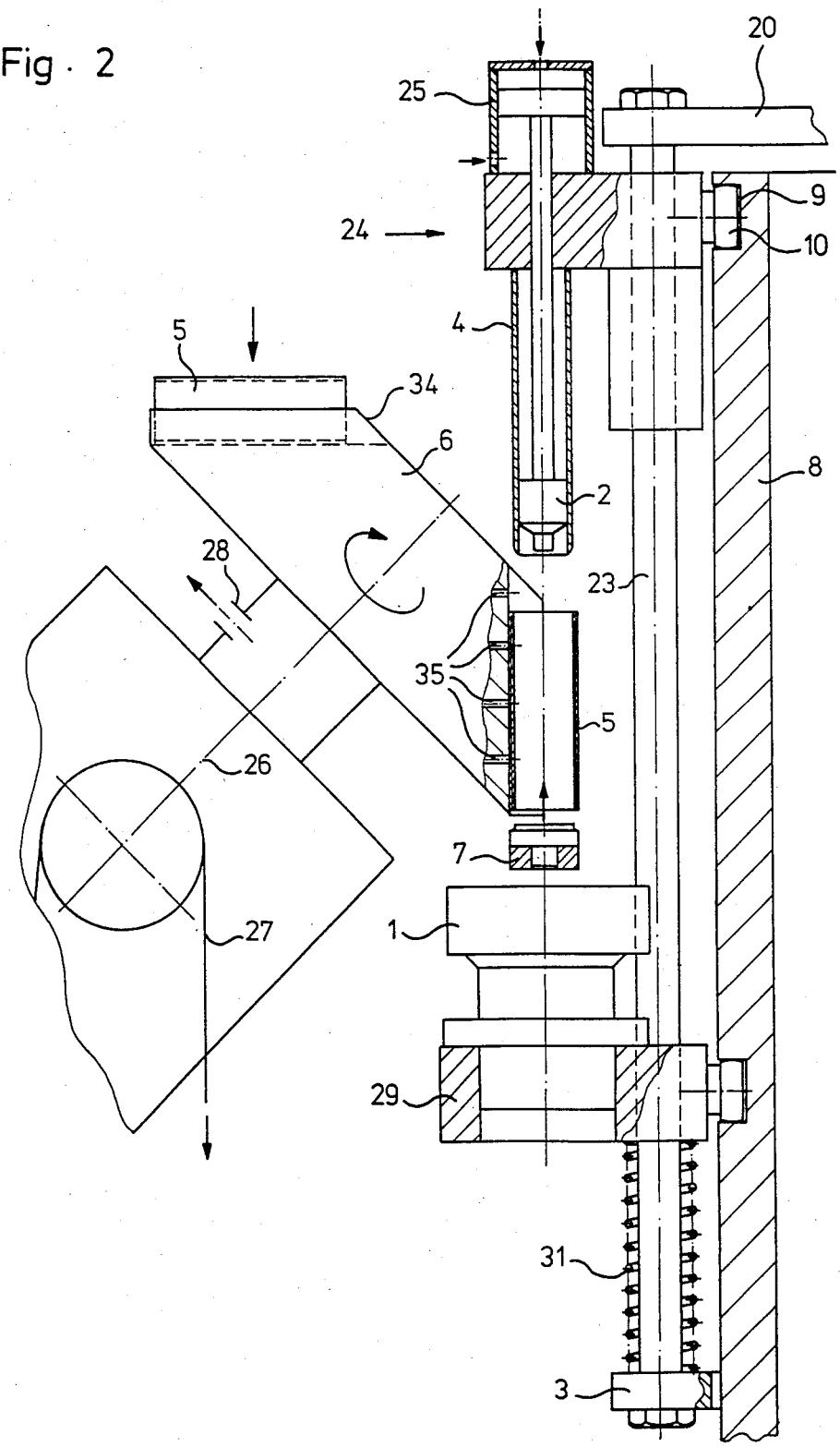
FIG. 2 is a view in cross-section through a loading station prior to a tubular body being pushed on to the mandrel.
Figure 3:
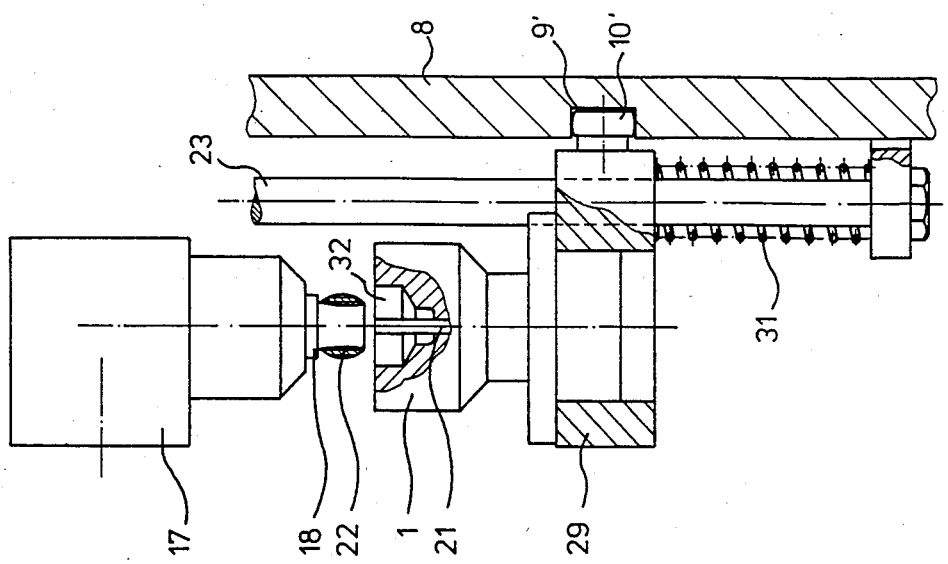
FIG. 3 is a view in cross-section through a filling station prior to the die being moved upwardly.

As can be seen in particular from FIGS. 1 to 3, the apparatus comprises a rotary member 3 which can be driven in rotation and which is mounted, for example, on a machine upright. The rotary member 3 is connected in a suitable fashion to a drive arrangement which is not illustrated herein. Dies 1 are arranged on the rotary member 3 in the peripheral region thereof, at uniform angular spacings. The dies 1 define the external configuration of the shaped body, being in the present case the shoulder portion of the tube with the outside screwthread on the neck of the tube.

Disposed above each die is a punch 2 which provides the internal configuration of the tube shoulder portion. The punch 2 is disposed at the lower end of a mandrel 4 and can be retracted into the interior of the mandrel for the purpose of loading the latter. In that way, the tubular body 5 can be better moved into position beneath the mandrel 4 as the mandrel has to be raised to a smaller degree, smaller by the height of the punch 2. Both the mandrel 4 with the punch 2 and the die 1 can be moved up and down in the line of pressing, in parallel relationship to the centre line of the rotary member 3. In this arrangement, the tool members are guided by way of a guide means 24 on a pair of vertical guide bars 23.

The guide bars 23 are fixed on the rotary member 3 and are held in the upper region by an annular disc 20. It will be seen that this provides for precise and stable guidance for the movable tool members. The pressing force for closing the shaping tool is applied by way of a pressure fluid cylinder 25 which is disposed on the line of pressing movement above the mandrel 4. The cylinder may be a hydraulic or a pneumatic cylinder of conventional kind.

A drum 8 is fixedly disposed in coaxial relationship with the rotary member 3. The drum 8 is provided roundabout with guide grooves 9 and 9' respectively into which the guide device 24 and the die holder 29 engage by means of guide rollers 10 and 10'. When the rotary member 3 rotates about the fixed drum 8, it will be seen that the guide rollers 10 and 10' follow the configuration of the guide grooves 9 and 9' so that, when these grooves rise or fall, the guide device 24 and the matrix holder 29 are displaced along the guide bars. In this way, the mandrels 4 with the punches 2 and the dies 1 perform a stroke movement with opening and closing the tool and for loading and unloading the mandrels. However, the actual pressing force is applied by way of the pressure fluid cylinder 25.

The die holders 29 are pressed downwardly when the tool is opened against the force of a stressing spring 31. The spring force is required, when the tool is closed, in order to move the die rapidly upwardly at the loading station, as will be further described hereinafter.

A suction drum 6 is disposed in the region of rotation of the rotary member 3, above the dies 1. The suction drum 6 is of a tapered configuration and, on its conical periphery, has shell-like depressions 34 for receiving the tubular bodies 5. The suction drum 6 rotates about its cone axis 26 which is so arranged relative to the axis of the mandrel 4 that a surface portion of the suction drum 6 extends parallel to the line of movement of the mandrel 4. The suction drum is driven by way of a drive belt 27 by a drive means (not shown). A vacuum is produced in the interior of the suction drum 6 by way of a vacuum conduit 28 so that the tubular bodies 5 can be held in any position in the depressions in the suction drum. A suction drum 6 can be used in the same manner both for loading and for unloading, the suction drum pivoting the tubular bodies 5 in the loading and unloading operations. The tubular bodies are delivered and taken away by respective known conveyor belts which are arranged above the suction drums 6.

As can be seen in particular from FIG. 2, a tubular body passes on to a suction drum 6 from a conveyor belt (not shown) and is held to the suction drum by the vacuum by way of openings 35 in the drum. The suction drum turns the tubular body 5 until it is held in coaxial relationship beneath the mandrel 4. In that position, a thrust member 7 is moved upwardly to push the tubular body 5 from the surface of the suction drum 6 on to the mandrel. The thrust member 7 may be activated for example by way of an eccentric wheel, or hydraulically or pneumatically.

Figure 5:
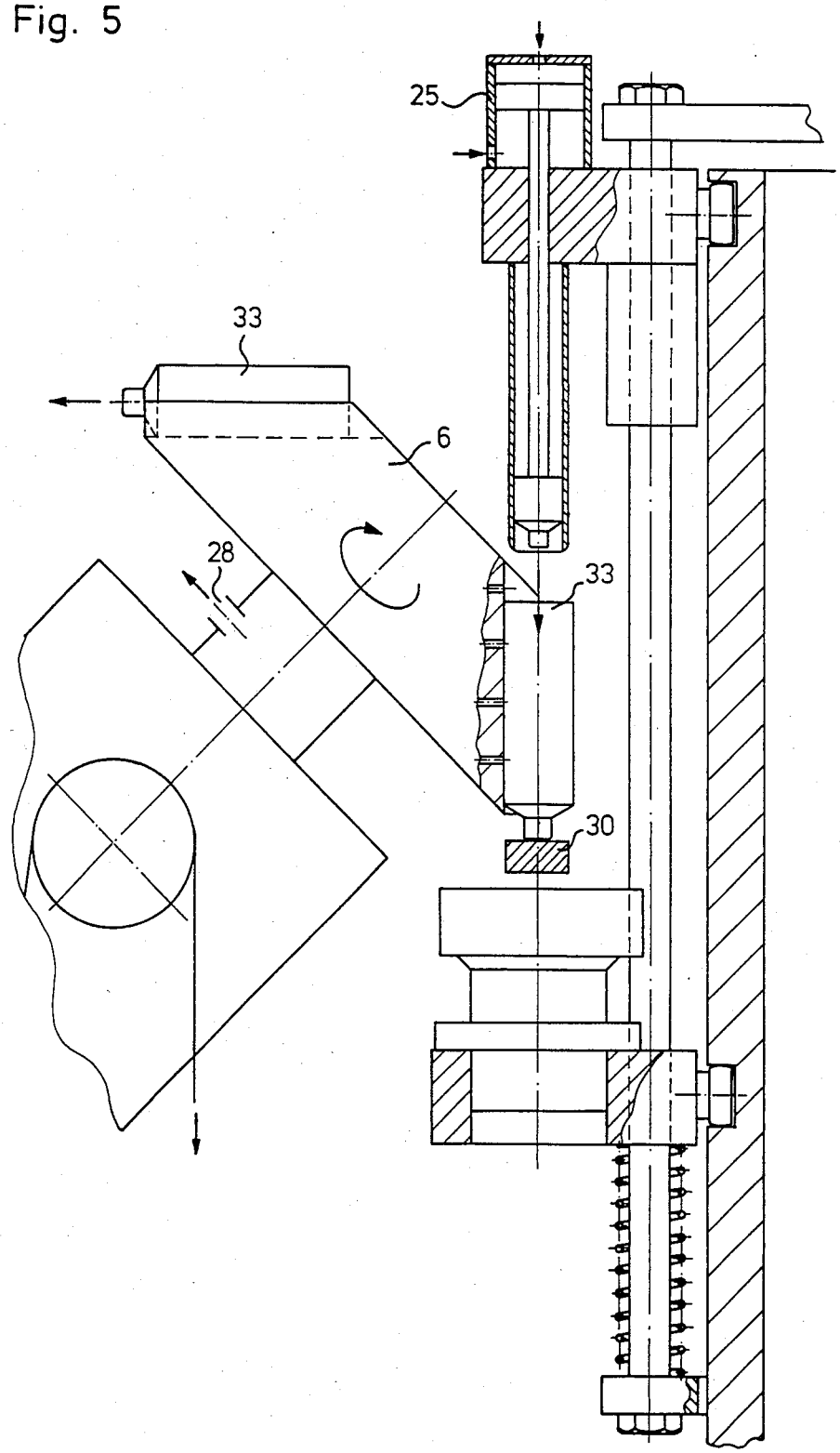
FIG. 5 is a view in cross-section through an unloading station with a tube body removed from the mandrel.

As shown in FIG. 5, it is also possible to use an unloading lever 30 for unloading the mandrel 4. The lever 30 can be activated in the same fashion as the loading thrust member 7. The function of the unloading lever 30 is to accompany the finished tube body 33 when it is blown off the mandrel 4 by means of compressed air in a controlled movement on to the surface of the suction drum 6.

Figure 4:
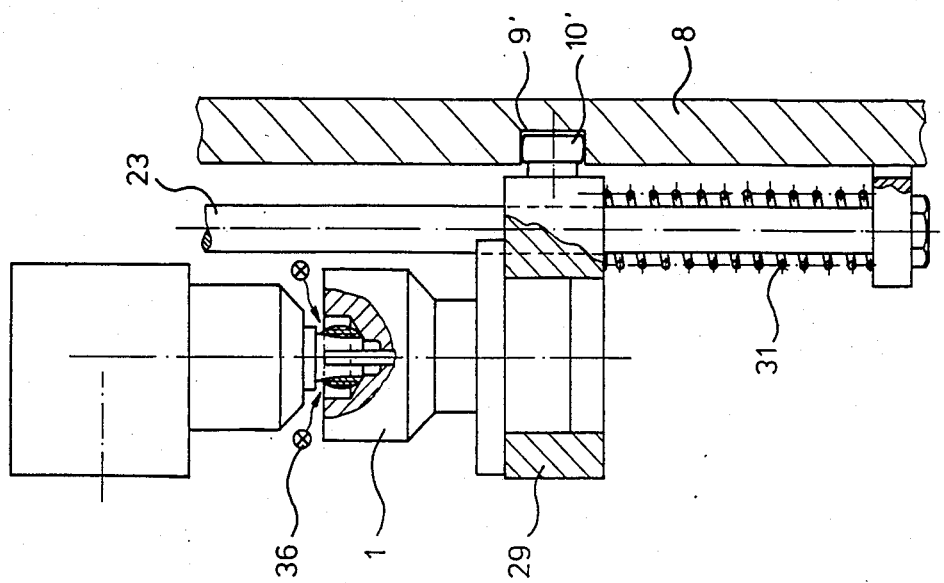
FIG. 4 shows the filling station of FIG. 3 with the die moved upwardly to remove the plastics blank.

FIGS. 3 and 4 show the positions of a die directly prior to and upon reaching the loading station. The die, which is shown in simplified form, has a mould cavity 32 into which the tube shoulder portion with the outside screwthread is pressed. For the purposes of forming the opening of the tube, a perforating punch 21 projects into the cavity in the die. At the filling station, an annular blank 22 of plasticised plastics material is pressed out of a discharge opening 18 which is disposed on a filling head 17. In FIG. 3, the blank 22 which is shown in cross-section has already come out of the discharge opening 18. The die 1 is still in such a low position that it is spaced from the blank 22.

As FIG. 4 shows, the die 1 is moved upwardly under the force of the spring 31, at the filling station, in such a way that the blank 22 is at least partly in contact with the wall of the cavity 32 in the die. In that position, the perforating punch 21 penetrates into the interior of the annular blank 22 so that there is virtually no possibility of the blank falling down in an inclined position. At the same time, the plastics blank which, in the meantime, has been separated from the flow of material from the extruder has been detached from the discharge opening 18 by means of a heat source 36 (shown in symbolic form). This operation involves removing the blank by actually causing it to melt, the surface of the blank and the cavity 32 being heated at the same time. The heat source 36, which is preferably disposed in an annular configuration, may be a pure radiant source or it may also emit heated gaseous agent.

Figure 6:
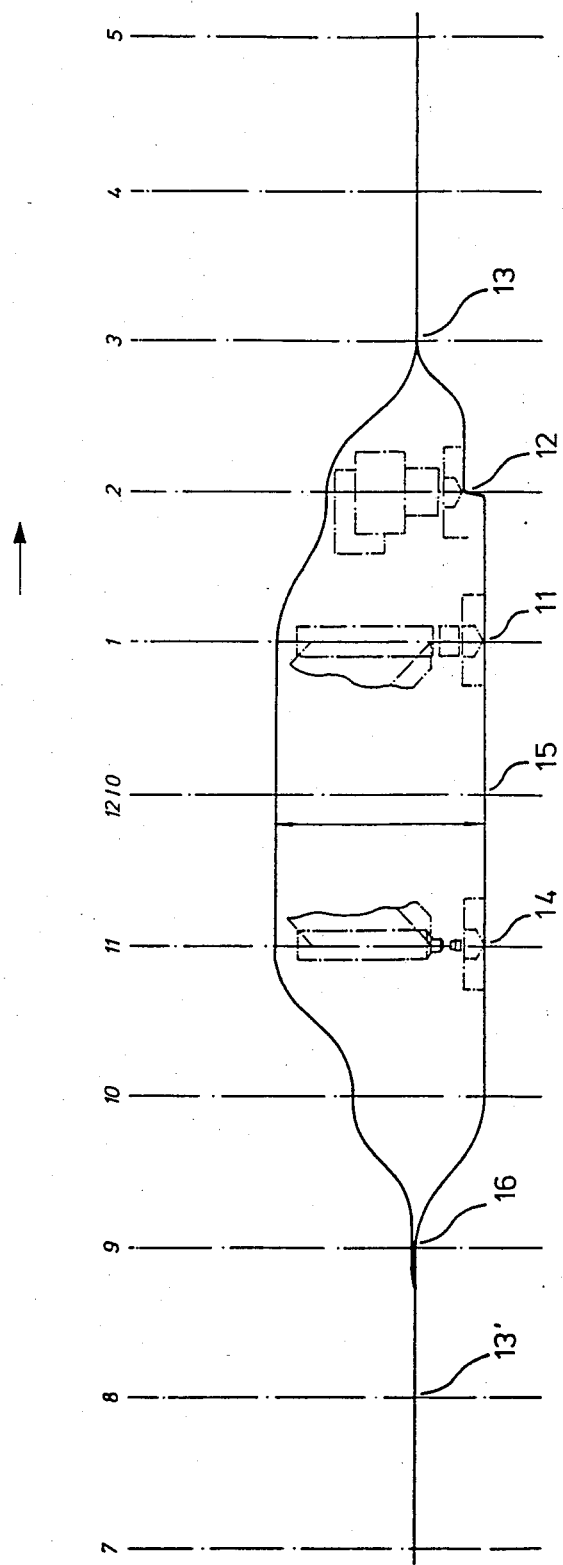
FIG. 6 is a diagram showing the stroke movement of the working tools at the individual working stations.

The mode of operation of the apparatus will be described hereinafter with reference to FIGS. 1 and 6. First, at the loading station 11, as already described, a tubular body 5 is held in position beneath the mandrel 4 by means of the suction drum 6. As can be seen in particular from the diagram in FIG. 6, the mandrel 4 is moved into its upper limit position at the loading station 11 and the die 1 is moved into its lower limit position. The tubular body 5 is pushed by means of the thrust member 7 from the surface of the suction drum 6 on to the mandrel 4. The rotary member 3 then rotates by one step, to reach the filling station 12. The configuration of the lift curve for the die in FIG. 6 clearly shows how the die is moved steeply upwardly directly prior to finally reaching the filling position. Disposed at the filling station 12 is an extruder 19 whose filling head 17 is arranged fixedly directly above the upper edge of the dies. Plasticised plastics material passes from the extruder 19 into the die by way of the filling head 17, as shown in FIGS. 3 and 4. FIG. 6 also shows that the loaded mandrel, with the punch, already begins to move downwardly between the loading station 11 and the filling station 12. The downward movement is precisely of such a degree that the loaded mandrel does not come into contact, with its lower edge, against the filling head 17.

After the step of filling the die 1, the rotary member 3 moves in the third step to the first cooling and pressing station 13. During the movement from the filling station 12 to the first cooling and pressing station 13, the punch moves further downwardly and reaches the lowest position in the third step of the procedure. The die 1 first also performs an approximately horizontal movement until it is moved out of the region of the filling head 17. The die 1 then also moves upwardly again until it reaches the highest position at the first cooling and pressing station 13. At the station 13, the two tool members are closed and the pressure fluid cylinder 25 is activated to apply the pressing force. In that operation, the punch 2 is pressed into the cavity 32 so that the shoulder portion of the tube is formed. At the same time, the tubular body 5 is connected to the plastics material of the shoulder portion.

The tool remains closed from the third step to the eighth step, which is denoted as the last cooling and pressing station 13' in FIG. 1. In that time, the shaped body cools down, now being integrally connected to the tubular body. The tubular body comprises a plastics material which has similar properties to the materiial of the shaped body. However, the tubular body may also be produced from a laminate. It is also possible to envisage that the tubular body may be produced entirely from metal or from another non-plasticisable material, and that the connection to the shaped body may be made in the die solely by pressing in retaining elements such as projections, barbs, etc.

After passing the last cooling and pressing station 13', that is to say (in the present embodiment) after cooling and pressing of about five and a half steps or cycles, the mandrel with the punch is retracted somewhat in order to permit the head of the tube to be unscrewed. In the unscrewing operation, the entire tube is displaced upwardly, which would obviously not be possible if the punch were in the fully pressed-in condition. The retraction movement of the punch can be seen from FIG. 6 directly prior to the ninth step, as a slight rise in the curve. The ninth step or cycle of the machine can be referred to as the unscrewing station 16 although the unscrewing operation can already begin when approaching that station. Thus it is possible, for example, for each individual die to have its own unscrewing device associated therewith. Alternately, however, the unscrewing operation may also be effected exclusively at the unscrewing station 16, by the dies being coupled into a fixedly disposed unscrewing device at the station 16.

As soon as the screwthread on the head of the tube has been removed from the mould, the punch with the mandrel begins to rise again, which is shown in FIG. 6 in the form of a rise in the curve, towards the tenth step in the cycle. The mandrel 4 is also once again pressed downwardly into its lowermost position against the force of the spring 31. The pressure fluid cylinder 25 is completely relieved of load or in certain usages may also be supplied with pressure fluid to operate in the reverse direction so that it assists the upward movement of the mandrel with the punch. Depending on the particular circumstances involved, it may be desirable for the upward movement of the mandrel 4 to be distributed over two steps in the machine cycle so that the control cam on the drum 8 is not of an excessively steep configuration. As can be seen from the diagram shown in FIG. 6, the punch first reaches its uppermost position in the eleventh step while a short waiting time is incorporated at the tenth step. In that connection, the control cam for controlling the mandrel extends horizontally directly at the tenth step in order to reduce the frictional forces which are to be overcome at the control cam when the rotary movement is re-instituted after the tenth step.

In the eleventh step, the mandrel 4 is again in the uppermost position, when the unloading station 14 is reached. A conical suction drum 6 is once again disposed at the unloading station 14. Compressed air is passed into the interior of the tubular mandrel 4 for unloading purposes, thereby causing the tube body 33 to be blown away downwardly. At the same time, an unloading lever 30 bears against the underside of the tube and guides the tube downwardly until it bears over its entire length against the surface of the tapered suction drum. By virtue of rotary movement of the suction drum, the tube body is again pivoted into a horizontal position and passed to a conveyor belt to be conveyed away.

In the illustrated embodiment, disposed between the unloading station 14 and the loading station 11 is a free station 15 which can be used for any purpose. Thus it would be possible, for example, to envisage introducing articles which are to be pressed into the shaped body, into the die, at the station 15. it will be appreciated that the process and apparatus are not limited to the twelve machine steps shown in the embodiment. Depending on the respective diameter of the rotary member 3 and after any processing steps that may of course still be required, it is possible to perform more machine steps with the corresponding number of shaping tools. The shaped bodies which are held fast on the mandrel are particularly suitable for further processing steps and it would be possible to envisage for example that further working steps such as printing, embossing, polymerisation and the like could also be carried out on the rotary member at given working stations. For the purposes of opening and closing the two tool members and for loading and unloading the mandrels, it would also be possible for only the mandrel with the punch or only the die alone to perform a stroke movement.

I claim:

1. A process for producing a shaped body of plastics material and for simultaneously connecting the shaped body to a tubular body, the process comprising the steps of:

moving each of a series of tubular bodies into a vertically oriented position vertically beneath a respective coaxially oriented tubular mandrel and vertically above an associated respective die, each said tubular mandrel and die being coaxial with each other and with said tubular body therebetween and mounted on a rotary member carrying peripherally a series of such tubular mandrels and dies each for receiving such a tubular body therebetween, at least one of said mandrel and associated die being displaced vertically away from the other to provide a clearance therebetween sufficient to receive the length of the tubular body;

pushing said vertically positioned tubular body upwards onto the coaxially oriented tubular mandrel;

rotating said rotary member with said relatively displaced mandrel and die to a filling station and filling said die with plasticised plastics material;

rotating said rotary member further and thereby moving together vertically said mandrel, tubular body and die by the action of a stationary control cam cooperating with at least one of said mandrel and said die, thus pressing said tubular body on the mandrel into the coaxially located filled die;

keeping the mandrel and die aligned in the same position with said control cam and pressurizing a pressure actuated piston to force a punch through said tubular mandrel into said plastics material to shape said plastics material in said die and and to connect the shaped body so formed to said tubular body; and displacing again said mandrel and die vertically relatively away from each other via said control cam and unloading the tubular body with the shaped body.

2. A process according to claim 1, including the step of preheating at least one of the two items consisting of said plastics material in said die and at least the region of said tubular body to be connected to the shaped body prior to pressing said tubular body into said die.

3. A process according to claim 1, comprising using suction to secure said tubular body to the surface of a tapered suction drum, rotating said drum to carry said tubular body to said vertical position vertically beneath said tubular mandrel and above said die and pushing said tubular body upwards from said drum onto said tubular mandrel by means of a thrust member.

4. A process according to claim 1, comprising using suction to secure said tubular body with said shaped body thereon subsequent to removal of said tubular body from said tubular mandrel, and rotating said drum to remove said tubular body with said shaped body thereon from the vicinity of said tubular mandrel.

5. A process according to claim 1, comprising moving said die relative to said rotary member to a discharge opening at a filling head and pressing a plastics blank out of said discharge opening into said die to fill said die with a measured quantity of plasticised plastics material.

6. A process according to claim 5, comprising using heat to separate said plastics blank from said plastics material at said discharge opening at said filling head.

7. A process according to claim 3, wherein said rotatable tapered suction drum moves each of said tubular bodies between a horizontally oriented position displaced from its associated mandrel and a vertically oriented position beneath its associated mandrel.

8. Apparatus for producing a series of shaped bodies of plastics material and simultaneously connecting each shaped body with an associated one of a series of tubular bodies, the apparatus comprising:

a drivable rotary member rotatable about a vertical axis;

a stationary cylindrical drum mounted in coaxial relationship with the axis of rotation of said rotary member, said cylindrical drum being formed with a control cam;

a plurality of dies mounted peripherally on said rotary member;

a plurality of tubular mandrels respectively mounted fixedly coaxially with said dies on vertical axes parallel to the axis of rotation of said rotary member;

a plurality of punches allocated respectively to said tubular mandrels for reciprocation therewith;

means cooperating with said control cam for separating vertically each said mandrel and associated punch from the associated die to provide a space for the introduction of a vertically oriented tubular body beneath and coaxial with said tubular mandrel and above and coaxial with said die, and for subsequently bringing them together to insert the end of a tubular body into the associated die;

means for introducing a vertically oriented tubular body into each said space beneath and coaxial with one of said mandrels and above and coaxial with said die;

means for pressing a vertically oriented tubular body upwardly onto a said mandrel when introduced into a said space between that mandrel and the associated die;

means for filling each die with a plasticised plastics material at a stationary location traversed by said dies before said mandrel, tubular body and die are brought together by said means cooperating with said control cam; and a plurality of pressing means allocated respectively to said tubular mandrels and their associated punches for displacing one of the items consisting of one of said tubular mandrels with its associated punch and the cooperating die to press said mandrel and punch into said die for pressing a shaped body and connecting a tubular body thereto, said pressing means comprising pressure fluid actuated piston and cylinder assemblies individually actuatable independently of the position of said rotary member about its axis of rotation.

9. Apparatus according to claim 8, in which each said die is equipped to follow said control cam and the apparatus includes springs respectively for urging the dies upwards, said means for filling each die comprising a plastics material loading station formed with a discharge opening for this material in the region of which said control cam has such a steep configuration that the die is moved by the force of the associated one of said springs with an approximately perpendicular stroke movement towards said discharge opening.

10. Apparatus for producing a series of shaped bodies of plastics material and simultaneously connecting each shaped body with an associated one of a series of tubular bodies, the apparatus comprising:

a drivable rotary member a plurality of dies mounted peripherally on said rotary member;

a plurality of tubular mandrels respectively mounted coaxially with said dies on vertical axes parallel to the axis of rotation of said rotary member;

a plurality of punches allocated respectively to said tubular mandrels for reciprocation therewith;

means for separating each said mandrel and associated punch from the associated die to provide a space for the introduction of a vertically oriented tubular body beneath and coaxial with said tubular mandrel;

means for introducing a vertically oriented tubular body into each said space beneath and coaxial with one of said mandrels;

means for pressing a vertically oriented tubular body upwardly onto a said mandrel when introduced into a said space beneath that mandrel;

means for filling each die with a plasticised plastics material at a stationary location traversed by said dies;

a plurality of pressing means allocated respectively to said tubular mandrels and their associated punches for displacing one of the items consisting of one of said tubular mandrels with its associated punch and the cooperating die to press said mandrel and punch into said die for pressing a shaped body and connecting a tubular body thereto; and a rotatable tapered suction drum mounted for rotation about a fixed axis and formed with tubular body positioning means and suction means for retaining a tubular body with its axis in a plane containing said axis of rotation of said tapered suction drum, means for rotating said suction drum about said last mentioned axis, said drum being positioned for the axis of said tubular body to be coincidental with the axis of each mandrel when presented to said mandrel, to enable the transfer of a tubular body between said drum and said mandrel.

11. Apparatus according to claim 10, wherein said rotatable tapered suction drum is constructed and arranged to move each of said tubular bodies between a horizontally oriented position displaced from its associated mandrel and a vertically oriented position beneath its associated mandrel.

* * * * *